United States Patent [19]

Awano et al.

[11] 4,211,431
[45] Jul. 8, 1980

[54] ACTUATOR DEVICE FOR SEAT BELT MECHANISM FOR MOTOR VEHICLE

[75] Inventors: Takeshi Awano; Toshiyuki Komizo, both of Okazaki, Japan

[73] Assignee: Mitsubishi Jidosha Kogyo Kabushiki Kaisha, Tokyo, Japan

[21] Appl. No.: 24,866

[22] Filed: Mar. 28, 1979

[51] Int. Cl.$^2$ ............................................. B60R 21/02
[52] U.S. Cl. .................................................... 280/804
[58] Field of Search ............... 280/804, 802, 807, 803; 296/146; 297/469

[56] References Cited

U.S. PATENT DOCUMENTS

| | | | |
|---|---|---|---|
| 3,583,726 | 6/1971 | Lindblad | 280/804 |
| 3,842,929 | 10/1974 | Wada | 280/804 |
| 3,995,884 | 12/1976 | Bauer | 280/804 |

Primary Examiner—John J. Love
Assistant Examiner—Randall A. Schrecengost
Attorney, Agent, or Firm—Oldham, Oldham, Hudak & Weber Co.

[57] ABSTRACT

An actuator device for a seat belt mechanism, comprising a rack slidable in a door or a body of a vehicle, a link connecting the rack with the body or door, a seat belt support member interlocked with the rack to move a seat belt into a restraining position and an unrestraining position with respect to a passenger, and a resilient member provided in the door or body. The resilient member operatively engages with the rack or link to counteract a movement of the rack and link relative to the door or body, thereby retaining the door in a given open position.

12 Claims, 9 Drawing Figures

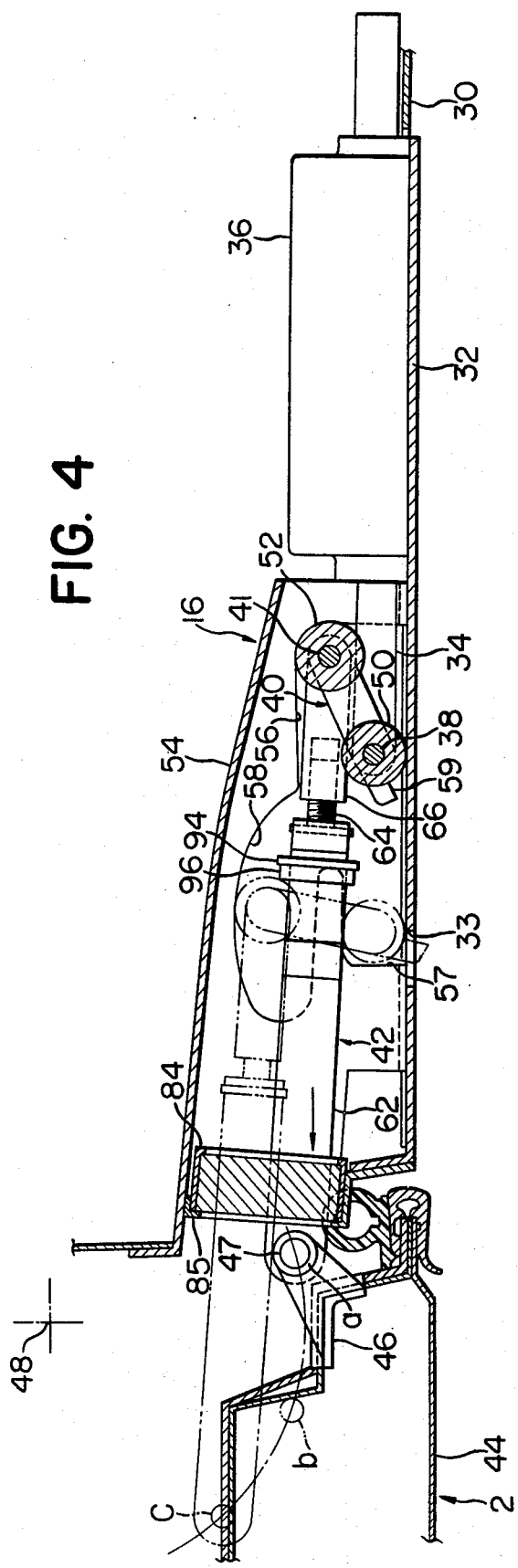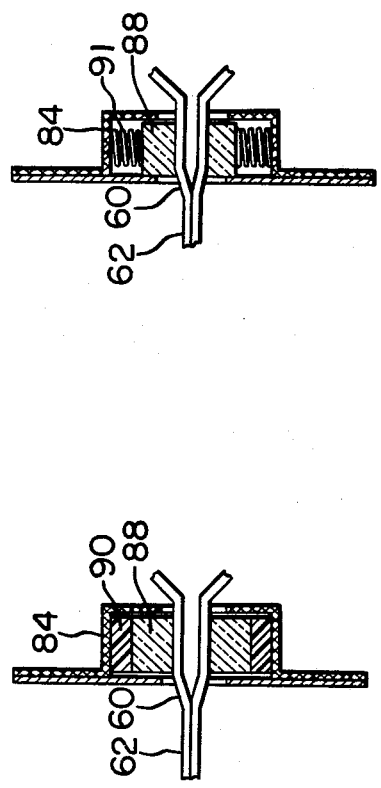

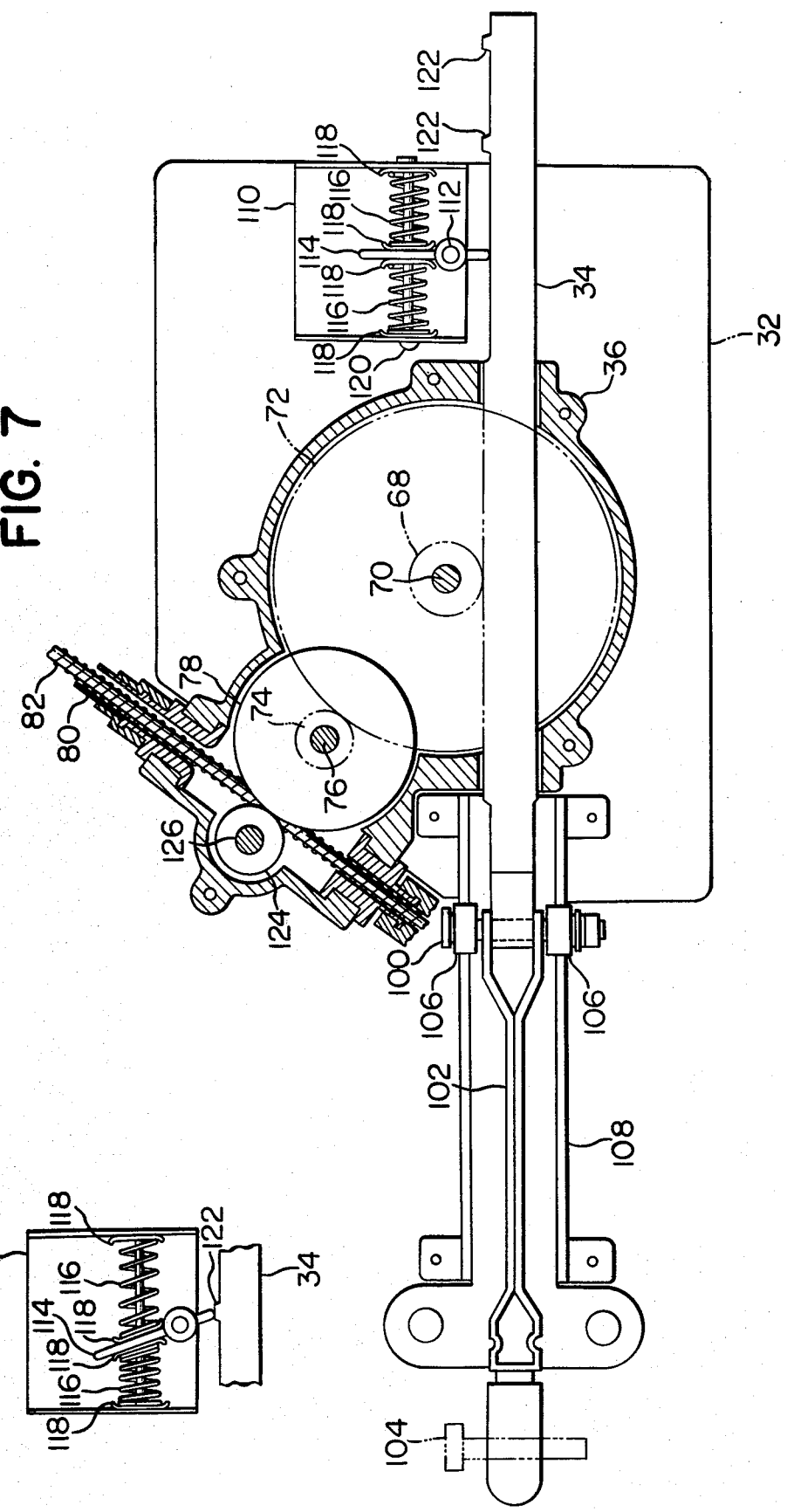

ACTUATOR DEVICE FOR SEAT BELT MECHANISM FOR MOTOR VEHICLE

BACKGROUND OF THE INVENTION

This invention relates to an improvement of an actuator device for a seat belt mechanism for a motor vehicle.

In a passive seat belt mechanism in which a seat belt support member such as an anchor or through ring is movably supported by a guide rail or guide arm provided in a door or body of the vehicle and moved into an unrestraining position for allowing a passenger to get into and out of the vehicle and a restraining position for restraining the passenger depending on opening and closing of the door, an actuator device is provided for moving automatically the seat belt support member into the unrestraining and restraining positions depending on opening and closing of the door. Also, door checker means for holding the door in a given open position is attached to the door. Usually, the actuator device for the passive seat belt mechanism and the door checker means are independently mounted in the door or vehicle body.

SUMMARY OF THE INVENTION

An object of this invention is to provide an actuator device for a seat belt mechanism mechanically interlocked with the door, in which door checker means for holding the door in a given open position is combined with the actuator device, so that number of parts thereof is substantially reduced comparing with a conventional system having independently the actuator device and door checker means, thereby reducing manufacturing cost and saving the space occupied by them.

BRIEF DESCRIPTION OF THE DRAWINGS

This invention will be explained by way of example with reference to the accompanying drawings in which:

FIG. 4 is a cross-sectional view taken along the line IV—IV in FIG. 3, FIG. 5 is a cross-sectional view of a door checker means in the actuator device shown in FIGS. 3 and 4 with said means being in an operative position, FIG. 6 is a cross-sectional view similar to FIG. 5, showing a modification of the door checker means of the first embodiment, FIG. 7 is a front view of a second embodiment of the actuator device according to the invention, partially in cross-section, FIG. 8 is an enlarged front view of the door checker means in the actuator device shown in FIG. 7, with said means being in an operation position.

DESCRIPTION OF THE PREFERRED EMBODIMENTS

Figure 1:
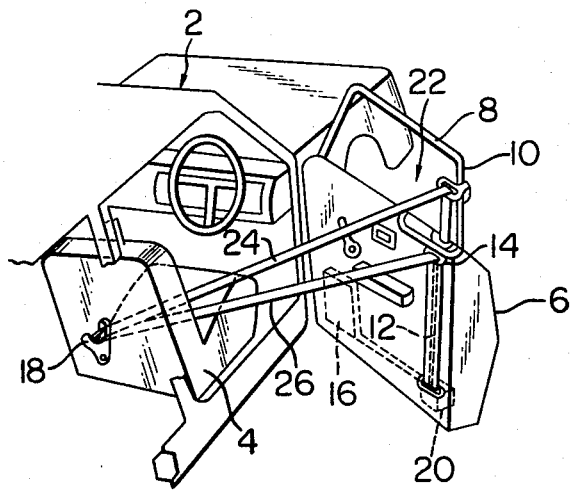
FIG. 1 is a schematic perspective view of a vehicle associated with a passive seat belt mechanism.
Figure 2:
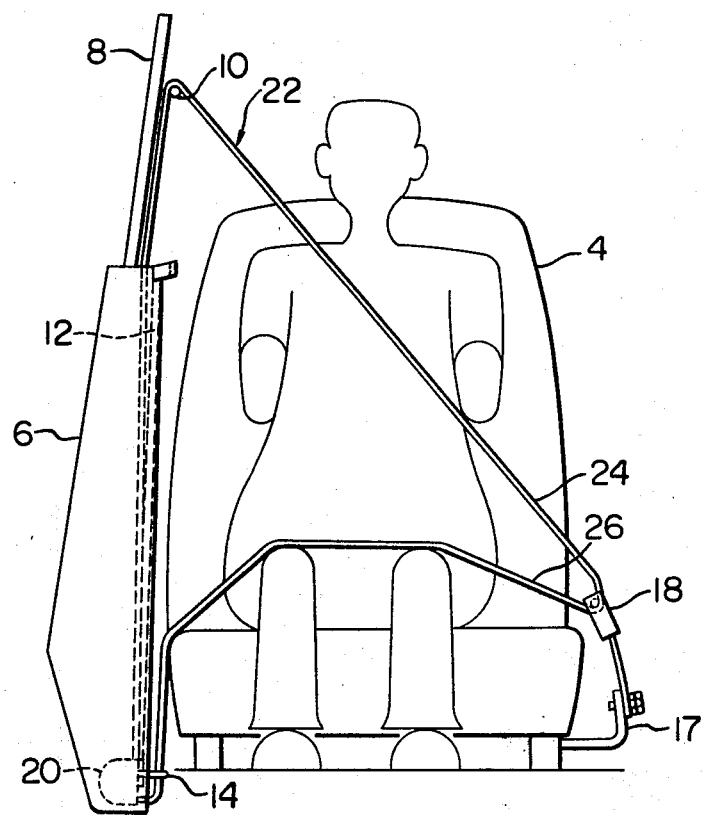
FIG. 2 is a schematic view showing a passenger with a seat belt fastened.

Referring to FIGS. 1 and 2, a motor vehicle comprises a body 2, a seat 4, and a door 6 pivotally supported at its forward edge by the body 2 and having a sash 8. This vehicle is associated with a passive seat belt mechanism. The passive seat belt mechanism comprises a first through member 10 attached to the rearward and upper portion of the sash 8, a guide 12 provided in the rearward portion of the door 6 and extending substantially in a vertical direction, a second through member 14 slidably supported in the guide 12, an actuator device 16 for moving the second through member 14 along the guide 12 toward the lower portion of the door 6 when the latter is closed and toward the center portion of the door 6 when the latter is opened, a third through member or belt hold member 18 fixed through a bracket 17 to the seat 4 at the side thereof nearer to the center of the body 2, a retractor 20 with an emergency locking device provided in the door, and a seat belt 22 extending through the first, third and second through members 10, 18 and 14 and having one end reeled on a reel shaft (not shown) of the retractor 20 and the other end reeled on said reel shaft with the one end wound thereon. The seat belt 22 defines a shoulder belt 24 between the first and third through members 10 and 18 and a waist belt 26 between the second and third through members 14 and 18. The seat belt 22 with the ends being wound on the common reel shaft of the retractor 20 is drawn out of the reel shaft simultaneously when the door 6 is opened and wound up onto the reel shaft simultaneously when the door 6 is closed.

In this construction of the passive seat belt mechanism, when the door 6 is opened as shown in FIG. 1, the shoulder belt 24 and the waist belt 26 are drawn out from the retractor 20, so that the shoulder belt 24 is stretched between the first and third through members 10 and 18. At the same time, the waist belt 26 is stretched between the third through member 18 and the second through member 14 which is moved toward the uppermost position of the guide 12 by operation of the actuator device 16. As both the belts 24 and 26 are moved away from the seat 4, the passenger can easiy get into and out of the vehicle. When the passenger sits on the seat 4 and closes the door 6 as shown in FIG. 2, the shoulder belt 24 and the waist belt 26 are reeled back into the retractor 20. The shoulder belt 24 is stretched between the first and third through members 10 and 18 to fit on the upper body of the passenger, whereas the waist belt 26 is stretched between the third through member 18 and the second through member 14 which is moved down to the lower portion of the door along the guide 12 by operation of the actuator device 16 and fits on the waist of the passenger. Thus, the passenger is automatically restrained by the seat belt 22 only by closing the door 6 after getting into the vehicle.

Figure 3:
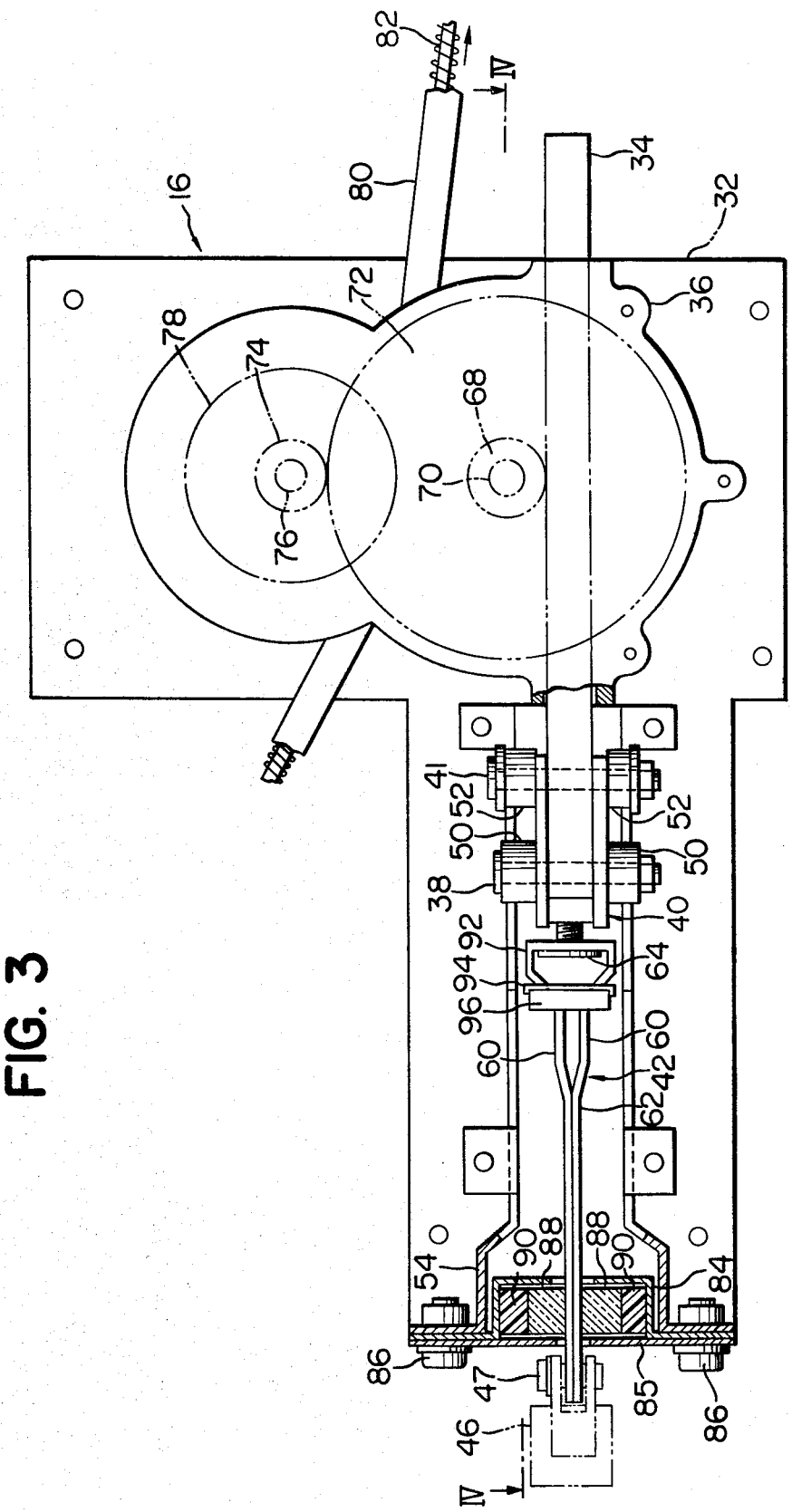
FIG. 3 is a front view of a first embodiment of an actuator device according to the invention, partially in cross-section.

In more detail, a first embodiment of the actuator device according to this invention is shown in FIGS. 3 to 5 and now explained.

Referring to FIGS. 3 and 4, the actuator device 16 includes a base plate 32 fixed on an inner panel 30 of the door 6, and a casing 36 fixed on the base plate 32 and supporting a rack 34 slidable in a direction of its longitudinal axis. One end of the rack 34 is pivotally connected through a pin 38 to one end of a first link 40 having a pair of plates disposed at opposite sides of the rack 34, while the other end of the first link 40 is pivotally connected to one end of a second link 42 through a pin 41. The other end of the second link 42 is pivotally connected through a pin 47 to a bracket 46 which is fixed to a pillar 44 adjacent to the forward edge of the door 6. The pivoting axis of the second link 42 relative to the pillar 44 is offset from the pivoting axis 48 of the door 6 relative to the pillar 44. Rollers 50 and 52 are rotatably mounted on the pins 38 and 41 respectively. These rollers 50 and 52 contact with and are guided on guide surfaces formed on a guide member 54 fixed to the base plate 32. The guide member 54 has a first guide surface 56 which is contacted by the rollers 52 and defines a track of movement thereof, a stop surface 57 against which the rollers 50 abut when the latter moves from a condition shown in FIGS. 3 and 4 toward the left by a predetermined distance, and a second guide surface 58 having an arc which corresponds to a track of movement of the rollers 52 about the pivoting axis of the rollers 50 after the latter abuts against the stop surface 57. The base plate 32 is provided with an aperture 33 into which a detent 59 formed on the first link 40 enters when the link 40 rotates about the pin 38 for the roller 50. The second link 42 comprises a first member 62 with engaging portions 60 which are formed by bending symmetrically and extruding outwardly one end of a pair of strip-like plates, and a second rod-like member 66 connected to the first member 62 through threads 64. A pinion 68 meshing with the rack 34 is fixedly mounted on a shaft 70 which is rotatably supported by the casing 36. A gear 72 having a diameter larger than that of the pinion 68 is also fixedly mounted on the shaft 70. A gear 74 of a small diameter meshing with the gear 72 is fixedly mounted on a shaft 76 which is rotatably supported by the casing 36. A drive wheel 78 having a diameter larger than that of the gear 74 is fixedly mounted on the shaft 76. The drive wheel 78 is formed at its outer periphery with a groove (not shown) in which a cable 82 inserted in a tube 80 fixed to the casing 36 engages. The cable 82 is connected to the second through member 14. A door checker means is provided in the actuator device 16. The door checker means comprises a casing 84 of a U-shape in section and a cover 85 for the casing 84 which are fixed to said guide member 54 by screws 86. The first member 62 of the second link 42 extends through the casing 84 and the cover 85. The casing 84 contains therein abutment members 88 engaging with the first member 62 and resilient members 90, such as a rubber, biasing the abutment members 88 toward the first member 62. A buffer member 96 is attached through a bracket 94 to a stopper 92 formed at the right-hand ends of the expanded engaging portions 60 of the first member 62.

According to the construction described above, when the door 6 is opened, the pin 47 is moved to the left in FIG. 4 relative to the door 6, assuming that the door 6 is stationary while the pillar 44 rotates in the clockwise direction about the pivoting axis 48. That is, the pin 47, which is disposed in a position a when the door 6 is in a full-closed position, is moved to a position b shown by a two-dot chain line at a predetermined half-open position of the door 6 and to a position c shown by a two-dot chain line at a full-open position of the door. By this movement of the pin 47 relative to the door 6, the rack 34 is also moved through the first and second links 40 and 42. This movement of the rack 34 rotates the drive wheel 78 through the pinion 68 and the gears 72 and 74 to move the cable 80, so that the second through member 14 is moved upwardly along the guide 12 in the door 6. Also, when the second link 42 is drawn out from the door 6 by a predetermined distance upon opening of the door, the rollers 50 abut against the stop surface 57 and the first link 40 rotates about the pin 38 to disengage the rollers 52 from the first guide surface 56. Consequently, the movement of the rack 34 relative to the door 6 is stopped. Further movement of the second link 42 causes only a rotation of the first link 40 about the pin 38. Therefore, by selectively determining the diameters of the pinion 68 and the gears 72 and 74 such that the second through member 14 moves to the upper end of the guide 12 when the rack 34 stops against the stop surface 57, it is possible to make easy for the passenger to get into and out of the vehicle at a given partial-open condition of the door 6.

When the door 6 is closed, the second link 42 is moved to the right in FIGS. 3 and 4. Since the detent 59 on the first link 40 engages with an edge of the aperture 33 formed in the base plate 32, it is ensured that the rollers 52 move along the guide surface 58 before the rollers 50 move, that is, the first link 40 firstly rotates about the pin 38.

When the pin 47 is disposed between the positions a and b in FIG. 4, that is, when the door 6 is in between the full-closed position and said half-open position, a friction force created in a drive system in the actuator device 16 between the rack 34 and the second through member 14 acts to prevent the movement of the second link 42, so that the door 6 is held in a given partial-open position. Also, when the pin 47 is disposed between the positions b and c in FIG. 4, that is, when the door 6 is in between said half-open position and the full-open position, the first link 40 can freely rotate about the pin 38, and the movement of the second link 42 is not counteracted by said friction force in the drive system accordingly. However, when the door 6 is in around the full-open position, that is, when the pin 47 is disposed at around the position c, the engaging portions 60 on the second link 42 engage with the abutment members 88 to compress the resilient members 90, as shown in FIG. 5. The reaction forces of the resilient members 90 act on the second link 42 to prevent the movement thereof, so that the door 6 is held in its open position. The stopper 92 abuts against the casing 84 through the buffer member 96 to prevent drawing of the second link 42 when the door 6 is fully opened, thereby determining a maximum open degree of the door 6.

In the abovedescribed embodiment according to this invention, the door checker means for holding the door 6 in its open position is provided in the actuator device 16 for the seat belt mechanism. It is, therefore, possible to substantially reduce member of parts for the door checker means, comparing with a conventional system having independently the actuator device for the seat belt mechanism and the door checker means, and save the space occupied by them.

A modification of the door checker means of the first embodiment is shown in FIG. 6. In this modification, coil springs 91 are used instead of the resilient member 90 of rubber in said embodiment.

In another modification (not shown), the engaging portions 60 may be formed in a concave shape, instead of forming as a protrusion. In this case, it is necessary to prestress the resilient members 90 so as to enable the abutment members 88 to enter into the corresponding engaging portions 60 of a concave shape.

A second embodiment of the actuator device according to this invention is shown in FIGS. 7 and 8. The components substantially the same as those in the first embodiment shown in FIGS. 3 to 5 are designated by the same numerals and not explained in detail.

Referring to FIGS. 7 and 8, one end of the rack 34 is pivotally connected through a pin 100 to one end of a link 102, while the other end of the link 102 is pivotally connected through a pin 104 to a bracket fixed to a pillar (not shown). Rollers 106 are rotatably mounted on the pin 100 and guided in a direction longitudinally of the rack 34 by a guide member 108 fixed to the base plate 32. A lever 114 is pivotally supported on a housing 110 fixed to the base plate 32 through a pin 112. A tip of the lever 114 contacts with the rack 34. This lever 114 is biased by resilient members such as coil springs 116 interposed between the lever and the housing 110 so that the lever 114 is normally disposed in a predetermined position with respect to a direction of rotation of the lever. Spring retainers 118 disposed at the ends of the coil springs 116 are positioned by a pin 120. The rack 34 is provided with two engaging portions 122 in the form of a protrusion, which abut against the lever 114 to rotate it when the rack 34 is moved in a direction longitudinally thereof. Furthermore, an idle pulley 124 is fixedly mounted on a shaft 126 rotatably supported by the casing 36 and adapted to urge the cable 82 onto the drive wheel 78.

According to the construction described above, as the door 6 is opened, the link 102 is drawn out from the door 6 and the rack 34 is moved to the left in FIG. 7. When one of the engaging portions 122 on the rack 34 engages with the lever 114, the lever 114 is rotated to compress the right-hand spring 116. A reaction force of this spring 116 counteracts the movement of the rack 34. Also, when the rack 34 is moved to the right, as shown in FIG. 8, the engaging portion 122 causes rotation of the lever 114 to compress the left-hand spring 116. This spring provides a reaction force counteracting the movement of the rack 34. The engaging portions 122 are so provided on the rack 34 that they are disposed adjacent to the right-hand side of the lever 114 when the door 6 is in a half-open position and a full-open position. Thus, the door 6 is held in its half-open position and full-open position.

Figure 9:
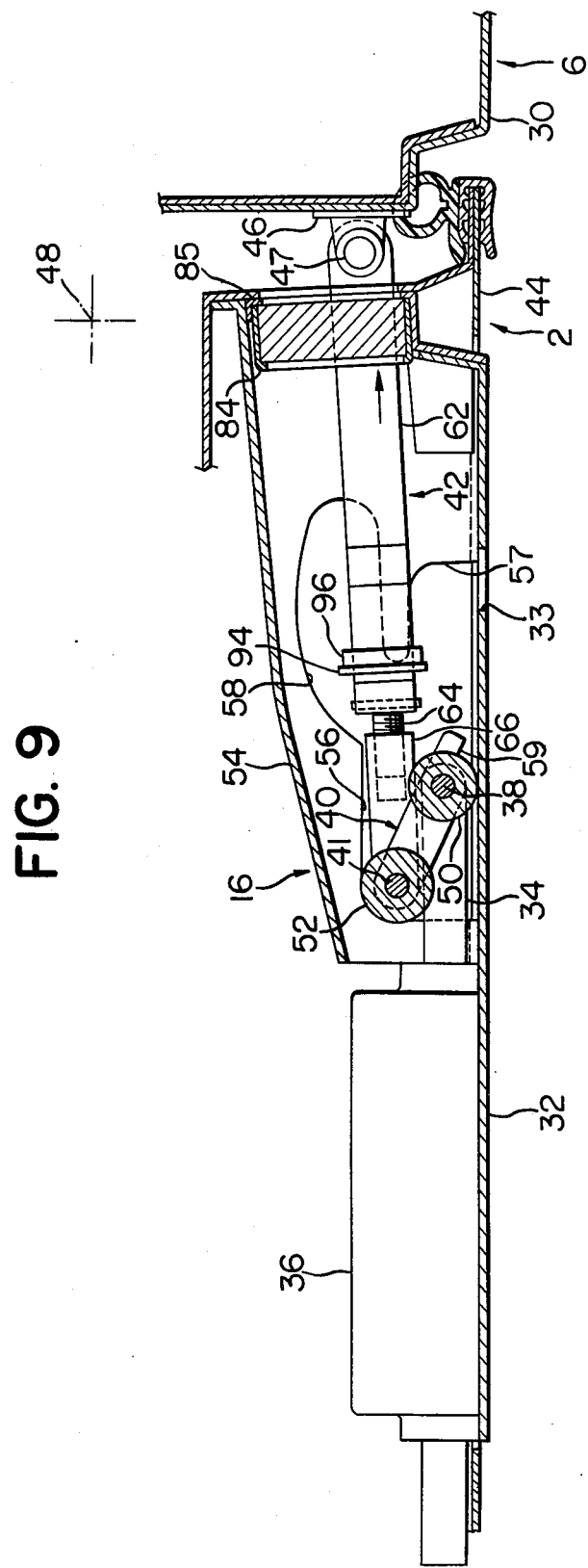
FIG. 9 is a longitudinal cross-sectional view of a third embodiment of the actuator device.

In the abovedescribed embodiments, the actuator device 16 is provided in the door 6, but the same operational effect can be obtained by providing the actuator device in the vehicle body, as shown in FIG. 9. In this third embodiment shown in FIG. 9, the actuator device 16 is identical to the actuator device shown in FIGS. 3 and 4, but is provided in the vehicle body 2. The components substantially the same as those in the first embodiment shown in FIGS. 3 and 4 are designated by the same numerals, and the operation of the actuator device is the same as that in the first embodiment.

What is claimed is:

1. An actuator device for a seat belt mechanism for a motor vehicle, comprising a rack member slidably received in either one of a door and a vehicle body pivotally supporting the door to allow the door to be opened and closed, at least one link member connecting said rack member with the other of said door and body, a pivoting point of said link member relative to said other of the the door and body being offset from a pivoting axis of said door relative to said body, a seat belt support member operatively connected to said rack member so as to interlock with the latter and responsive to a relative movement between said one of the door and body and said rack member to move a seat belt into a restraining position and an unrestraining position with respect to a passenger, and at least one resilient member provided in said one of the door and body and operatively engaging with at least one of said rack and link members to provide a reaction force counteracting a movement of said rack and link members relative to said one of the door and body, whereby said door is held in a given open position by said reaction force.

2. An actuator device according to claim 1, wherein said one of the rack and link members is provided with at least one engaging portion, said resilient member operatively engaging with said engaging portion through at least one abutment member and being compressed when said abutment member is engaged by said engaging portion by the movement of said rack and link members relative to said one of the door and body.

3. An actuator device according to claim 2, wherein said engaging portion is provided on each side of said one of the rack and link members, said abutment member being biased to engage with said each side of said one of the members by said resilient member.

4. An actuator device according to claim 3, wherein a casing, through which said one of the rack and link members extends, is fixed to said one of the door and body, said casing containing therein said abutment member and said resilient member.

5. An actuator device according to claim 2, wherein said abutment member comprises a lever pivotally supported by said one of the door and body and biased by said at least one resilient member toward a predetermined position with respect to a direction of rotation of the lever, said lever being engaged by said engaging portion to be rotated when said rack and link members are moved relative to said one of the door and body.

6. An actuator device according to claim 5, wherein said resilient member is provided at each side of said lever with respect to said direction of rotation thereof so as to hold the lever.

7. An actuator device according to claim 2, wherein said link member has a portion formed by strip-like plates, said engaging portion being formed integrally with said strip-like plates.

8. An actuator device according to claim 7, wherein said portion of the link member comprises a first member formed by said strip-like plates and formed with said engaging portion, and a second member of a rod-like shape connected to said first member through threads.

9. An actuator device according to claim 1, wherein said one of the rack and link members is provided with a stopper which abuts against said one of the door and body to prevent the movement of said rack and link members, thereby determining a maximum open degree of said door.

10. An actuator device according to claim 9, wherein said stopper abuts against said one of the door and body through a buffer member.

11. An actuator device according to claim 4, wherein said one of the rack and link members is provided with a stopper which abuts against said casing to prevent the movement of said rack and link members, thereby determining a maximum open degree of said door.

12. An actuator device according to claim 11, wherein said stopper abuts against said casing through a buffer member.

* * * * *

UNITED STATES PATENT AND TRADEMARK OFFICE
CERTIFICATE OF CORRECTION

PATENT NO. : 4,211,431
DATED : July 8, 1980
INVENTOR(S) : Takeshi Awano et al.

It is certified that error appears in the above—identified patent and that said Letters Patent is hereby corrected as shown below:

In the title, on the front page of the patent, the following covention priority data should be added -- March 30, 1978      Japan      53-40081 (U)

February 6, 1979    Japan      54-12571 --.

Signed and Sealed this

Eleventh Day of November 1980

[SEAL]

Attest:

Attesting Officer

SIDNEY A. DIAMOND

Commissioner of Patents and Trademarks